A. B. NEWMAN, Jr.

Propagating Plants.

No. 64,245 Patented Apr. 30, 1867.

United States Patent Office.

A. B. NEWMAN, JR., OF WATKINS, NEW YORK.

Letters Patent No. 64,245, dated April 30, 1867.

---

BOX FOR PROPAGATING PLANTS.

---

The Schedule referred to in these Letters Patent and making part of the same.

---

TO ALL TO WHOM IT MAY CONCERN:

Be it known that I, A. B. NEWMAN, Jr., of the village of Watkins, in the county of Schuyler, and State of New York, have invented a new and improved Box or Trough for Propagating and Growing Plants, Vines, Vegetables, Small Fruits, Shrubs, Seedlings, and Stocks; and I do hereby declare that the following is a full and exact description thereof, reference being had to the accompanying drawings, and to the letters of reference marked thereon.

Figure 1:
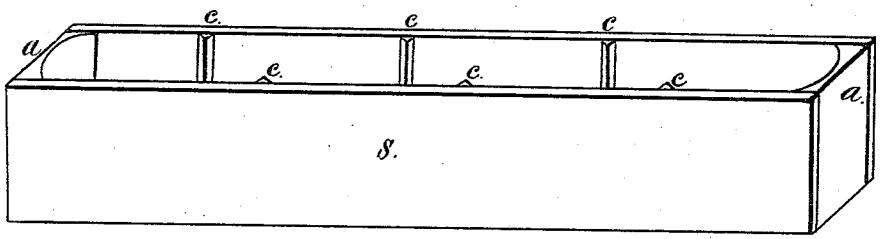
Figure 2:
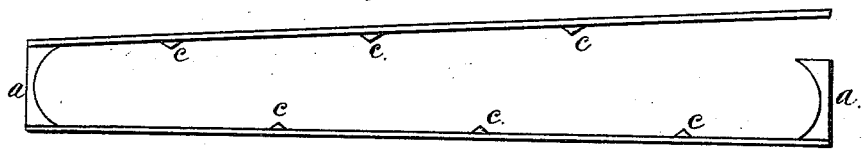
Figure 3:

The nature of my invention consists of a box or trough, Figure 1, two to three inches wide, three to six inches high, more or less, to best accommodate the plants to be grown, and of any length desired, having regard to convenience in handling and spaces to be occupied by them, with one side loose on one or both ends, or having a hinge with a button attached or removable, or one end of one side, Figure II, not being nailed fast. It can be quickly and cheaply fastened by wrapping a fine wire around the end not fastened, to remain while the plants are growing, and quickly slipped off if to be planted in the border or open ground. The fine wire used for small tree labels will be most suitable for this. To be wider at the bottom than the top, when desired. The ends of the box or trough, a, to be either curved or square on the inside, and ribs, c c, used on the inside of each side, when desired, for maturing plants, or the roots are to grow over three or four inches. With or without a bottom, Figure III, to stand upon.

The advantage of growing plants of any description in boxes or troughs above described is, that when started from seeds, cuttings, or eyes, they can be grown without transplanting, which always checks their growth.

When the plants are small the boxes or troughs can be placed in close proximity, and as they grow larger and require more room to form a healthy and natural growth of top and leaves, they can be moved further apart without checking their growth or injuring or disturbing their roots, this being of much value and consideration when plants are grown under glass. For instance, lettuce can be started with the boxes or troughs close to each other, and as it grows larger and begins to form heads, they can be moved further apart, to afford room for large heads for winter or early use; and this rule will apply to other plants with equal force—a consideration that will be highly appreciated by experienced propagators. When the roots reach the inside curves, a, of the ends of the box or trough, the growing end will move around the curve and start back lengthwise of the box or trough, and can then pass the whole length through the earth unobstructed, and at the other end the same curves a will again guide it back in the opposite direction, thus making long and natural roots to nourish the plants and give them strength and vigor. The oval strips or ribs, c, on the inside, will guide the moving ends of the roots from the outside of the box or trough, so that the roots, instead of drawing substance only on one side, that next the earth, and none next to the wood or outside, by being wholly in the earth will feed the plant by its fibres on both sides, when it will grow with much more vigor. And another important consideration is gained by these ribs c, if the plants are to be planted in the open ground after being started under glass, by the roots being kept from growing wholly or in part on the outside of the box or trough, for really only one side of the roots continues to nourish the plants when first moved to the open ground, if allowed to grow in the usual way. These boxes or troughs with plants can be moved, one or more at a time, by placing them on a board, if without a bottom, and moved in the same house, or from one glass house to another, or to the open ground. When to be moved to the open ground to mature or grow, the earth with the plants can be dropped out, Fig. II, without its being crumbled or the roots being disturbed in the least—a very important consideration when plants are moved from the warm and sheltered glass house to the open air and sun. Fig. II shows the manner of dropping out the earth.

What I claim as my invention, and desire to procure by Letters Patent, is—

A box or trough for propagating or growing plants, vines, vegetables, small fruits, shrubs, seedlings, and stocks, as herein described.

A. B. NEWMAN, JR.

Witnesses:
E. C. FOREST,
ROBERT CURRY.